United States Patent
Asaka

(10) Patent No.: US 8,210,835 B2
(45) Date of Patent: Jul. 3, 2012

(54) PUMP APPARATUS, ASSEMBLING METHOD OF THE SAME AND WASHER SYSTEM FOR VEHICLE

(75) Inventor: Hiroyasu Asaka, Kosai (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 888 days.

(21) Appl. No.: 12/153,827

(22) Filed: May 27, 2008

(65) Prior Publication Data

US 2008/0304988 A1    Dec. 11, 2008

(30) Foreign Application Priority Data

Jun. 11, 2007  (JP) .................................. 2007-154444

(51) Int. Cl.
*F04B 35/04*  (2006.01)
(52) U.S. Cl. ............. 417/423.7; 417/423.14; 239/284.1; 239/284.2
(58) Field of Classification Search .. 417/423.1–423.14; 239/284.1–284.2
See application file for complete search history.

(56) References Cited

U.S. PATENT DOCUMENTS

| | | | | |
|---|---|---|---|---|
| 5,184,946 A * | 2/1993 | Sato | | 417/423.9 |
| 5,360,322 A * | 11/1994 | Henein et al. | | 417/313 |
| 6,296,198 B1 * | 10/2001 | Tores | | 239/284.1 |
| 6,663,362 B1 * | 12/2003 | Lentz et al. | | 417/423.7 |
| 6,708,899 B2 * | 3/2004 | Nakano et al. | | 239/284.2 |
| 2006/0057001 A1 * | 3/2006 | Chen | | 417/423.1 |
| 2006/0066155 A1 * | 3/2006 | Matin et al. | | 310/52 |
| 2007/0048157 A1 * | 3/2007 | Collins et al. | | 417/423.3 |

FOREIGN PATENT DOCUMENTS

DE         4411960 A1 * 10/1995
JP         A-2004-025955       1/2004

OTHER PUBLICATIONS

Derwent information for foreign reference DE-4411960-A1.*
Derwent information for foreign reference DE-4411960-A1, published Oct. 1995.*
Office Action mailed Jul. 21, 2011 in corresponding CN application No. 2008 1012 5528.6 (and English translation).

* cited by examiner

*Primary Examiner* — Charles Freay
*Assistant Examiner* — Thomas Fink
(74) *Attorney, Agent, or Firm* — Posz Law Group, PLC

(57) ABSTRACT

In a pump apparatus of a washer system, a closure member closes an opening of a motor housing and an opening of a circuit box. The closure member includes a plurality of terminal receiving holes. Each corresponding terminal is inserted through a corresponding one of the terminal receiving holes. One end of each terminal is placed at an interior part of the pump apparatus and is electrically connected to a corresponding one of a motor received in the motor housing and a control circuit received in the circuit box while the other end of each terminal is placed at the exterior part of the pump apparatus and forms a connection contact that is electrically connectable with a corresponding connection contact of an external connector.

8 Claims, 9 Drawing Sheets

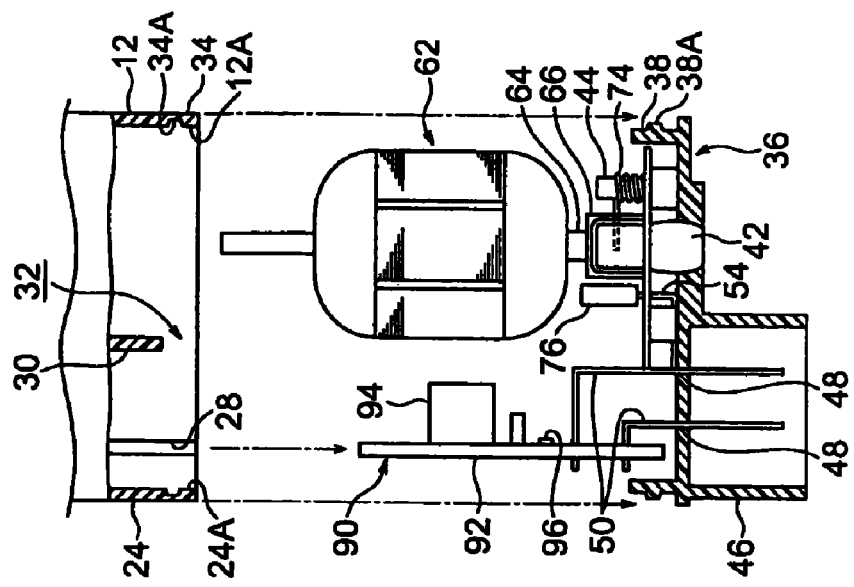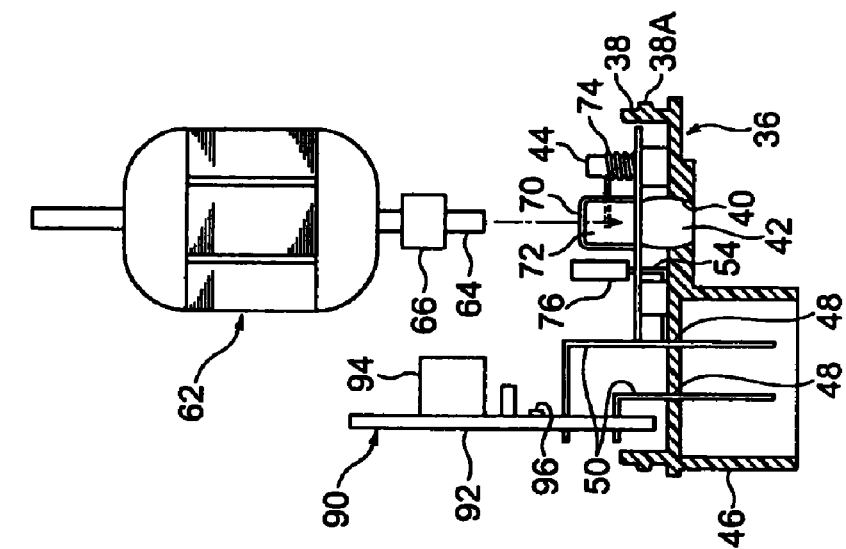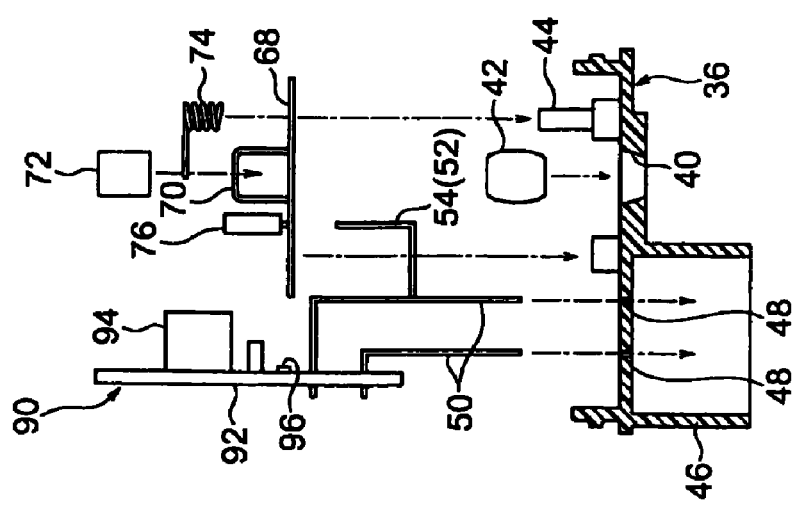

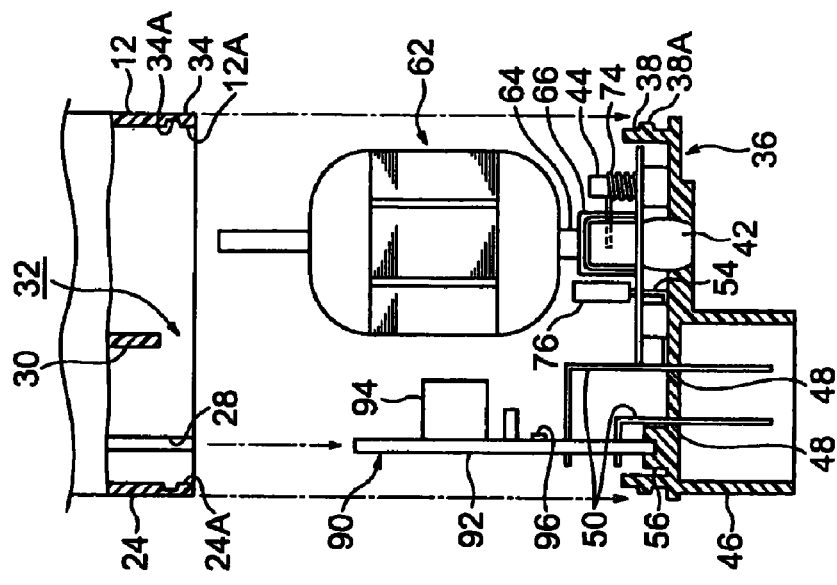
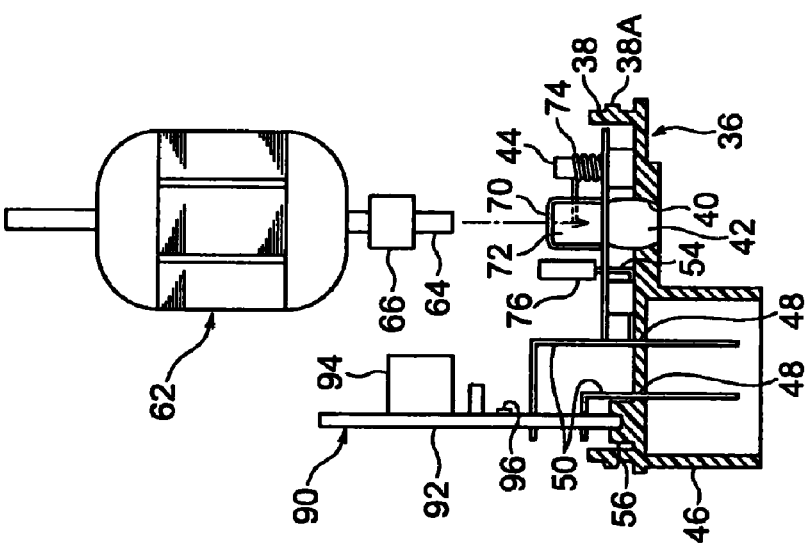
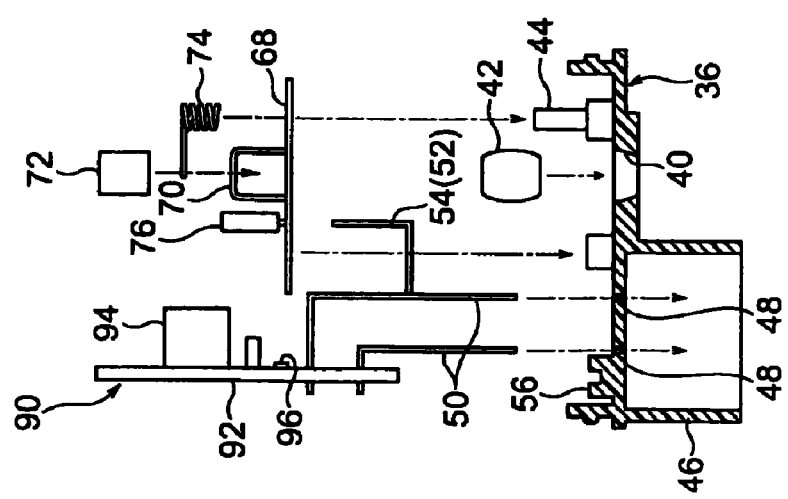

Pump Apparatus, Assembling Method of the Same and Washer System for Vehicle

CROSS REFERENCE TO RELATED APPLICATION

This application is based on and incorporates herein by reference Japanese Patent Application No. 2007-151411 filed on Jun. 11, 2007.

BACKGROUND OF THE INVENTION

1. Field of the Invention

The present invention relates to a pump apparatus, an assembling method of the same and a washer system for a vehicle.

2. Description of Related Art

Previously, various types of washer systems, which spray washer fluid over headlamps and/or a window glass (windshield) of a vehicle to wash the same, have been proposed. Japanese Unexamined Patent Publication No. 2004-25955 discloses one such washer system. This washer system includes a pump apparatus main body and a circuit box, which are installed to a washer tank.

However, in the above washer system, the circuit box and the pump apparatus main body are formed separately from each other and are then separately assembled to the washer tank. Thus, the washer system has the following disadvantages.

That is, separate installation structures are required to respectively install the circuit box and the pump apparatus main body to the washer tank. Also, a power supply line (an external wire harness), which electrically connects between the circuit box and the pump apparatus main body, is required.

Furthermore, at the time of driving the vehicle, rain water accumulated on a road surface may be splashed by tires of the vehicle over the washer tank. Also, at the time of filling water or washer fluid to the washer tank, the water or washer fluid may possibly be spilled over the washer tank. Thus, a waterproof structure is required to the circuit box separately from that of the pump apparatus main body. Furthermore, in the case where the power supply line is connected to the circuit box and the pump apparatus main body through connectors, the connectors should be formed as waterproof connectors. Therefore, the number of assembling steps and the costs of the parts are increased, thereby resulting in increased overall costs.

SUMMARY OF THE INVENTION

The present invention addresses the above disadvantages. Thus, it is an objective of the present invention to provide a pump apparatus, an assembling method of the pump apparatus and a washer system for a vehicle, which enable a reduction of costs.

To achieve the objective of the present invention, there is provided a pump apparatus, which includes a pump housing, a motor housing, a circuit box, a closure member and a plurality of terminals. The pump housing receives an impeller, which is rotated by an electric motor to pump liquid received in an external tank. The motor housing is formed integrally with the pump housing and receives the motor. The circuit box is formed integrally with the motor housing and receives a control circuit, which is electrically connected to the motor and controls rotation of the motor. An interior of the circuit box and an interior of the motor housing form an interior part of the pump apparatus. The closure member includes a closing portion, which closes an opening of the motor housing and an opening of the circuit box. The closing portion includes a plurality of terminal receiving holes that communicate between the interior part and an exterior part of the pump apparatus. Each of the plurality of terminals is inserted through a corresponding one of the plurality of terminal receiving holes. One end of each terminal is placed at the interior part of the pump apparatus and is electrically connected to a corresponding one of the motor and the control circuit while the other end of each terminal is placed at the exterior part of the pump apparatus and forms a connection contact that is electrically connectable with a connection contact of an external connector.

To achieve the objective of the present invention, there is also provided an assembling method for assembling the above pump apparatus. According to the assembling method, the one end of each of the plurality of terminals is connected to the corresponding one of the motor and the control circuit. The other end of each of the plurality of terminals is inserted through the corresponding one of the plurality of terminal receiving holes. The motor is supported by the closure member. The motor housing and the circuit box are assembled to the closure member to close the opening of the motor housing and the opening of the circuit box with the closure member.

To achieve the objective of the present invention, there is also provided a washer system for a vehicle. The washer system includes the above pump apparatus and a washer tank. The washer tank serves as the external tank and receives washer fluid as the liquid. The pump apparatus is assembled to the washer tank.

BRIEF DESCRIPTION OF THE DRAWINGS

The invention, together with additional objectives, features and advantages thereof, will be best understood from the following description, the appended claims and the accompanying drawings in which:

FIGS. 5A to 5C are descriptive views for describing an assembling method of the pump apparatus;

FIGS. 10A to 10C are descriptive views showing modifications of the pump apparatus and the assembling method thereof.

DETAILED DESCRIPTION OF THE INVENTION

An embodiment of the present invention will be described with reference to the accompanying drawings.

Figure 1:
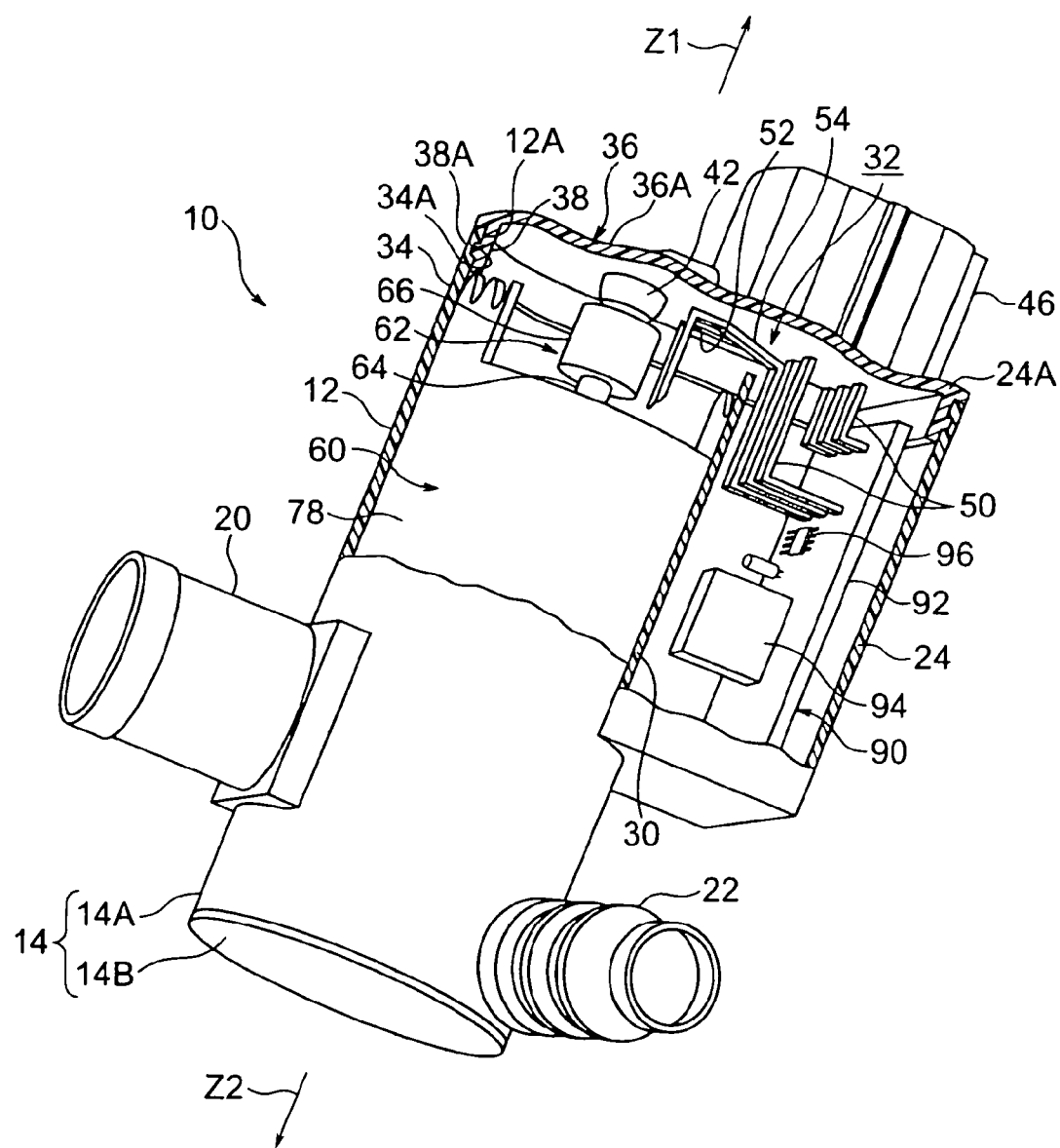
FIG. 1 is a partially fractured perspective view of a pump apparatus according to an embodiment of the present invention.

With reference to FIGS. 1 to 4, a pump apparatus 10 of the present embodiment is assembled to a washer tank and pumps washer fluid (liquid) received in the washer tank to spray nozzles, which spray the pumped washer fluid over headlamps of a vehicle (or a window glass of the vehicle). Here, it should be noted that the use of the pump apparatus 10 is not limited to the above one and may be modified in various ways. With reference to FIG. 1, the pump apparatus 10 includes a generally cylindrical motor housing 12 made of resin. The motor housing 12 receives a direct current brush motor (hereinafter, simply referred to as an electric motor or a motor) 60 and has an opening 12A on one axial side (Z1 side in FIG. 1) of the motor housing 12 in an axial direction of the motor 60.

Figure 2:
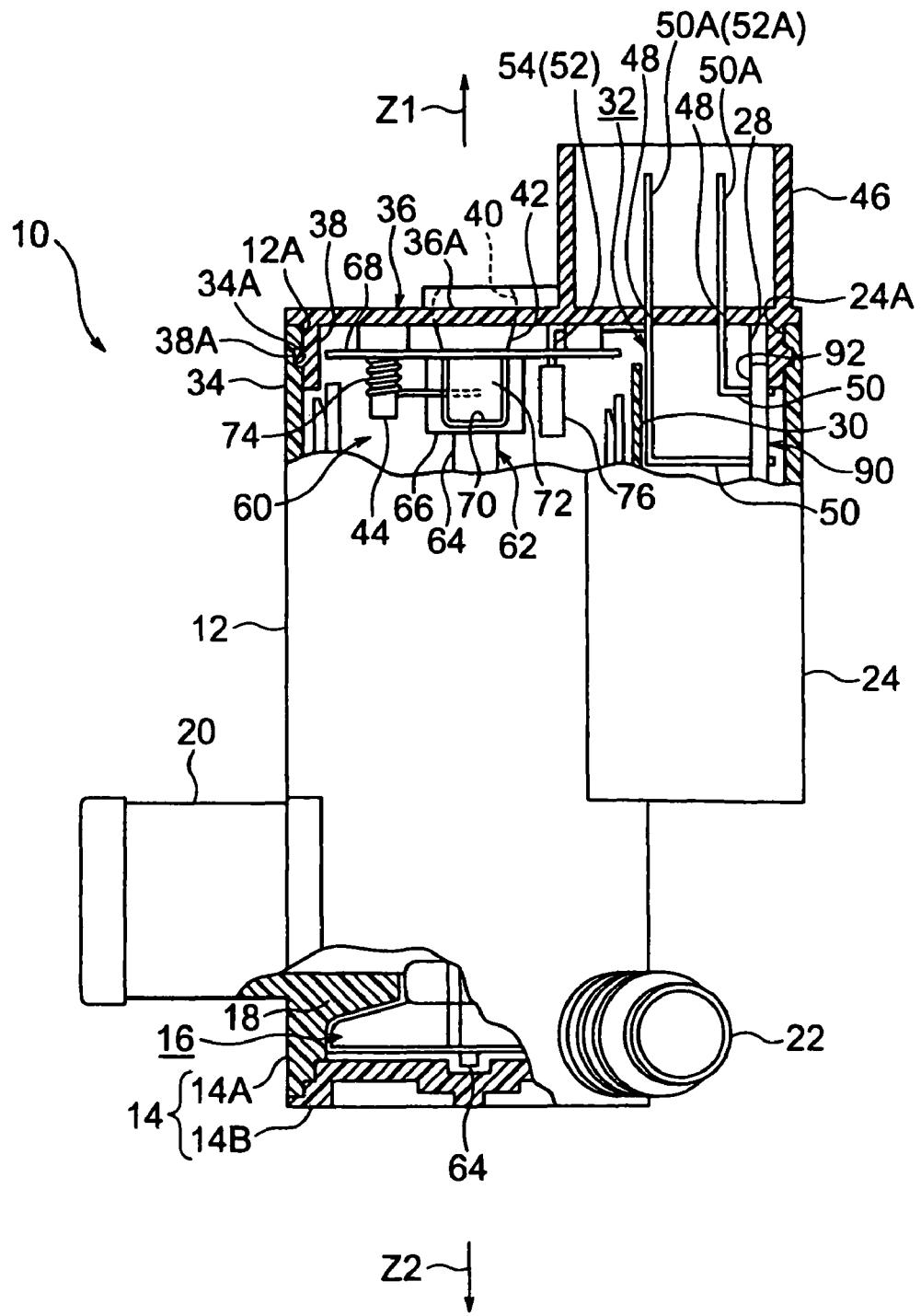
FIG. 2 is a partially fractured side view of the pump apparatus.

A pump housing 14 is formed integrally with the motor housing 12 on the other axial side (Z2 side) of the motor housing 12 in the axial direction of the motor 60. As shown in FIG. 2, the pump housing 14 includes a generally cylindrical housing main body 14A and a cover 14B. The housing main body 14A is formed continuously from the motor housing 12. The cover 14B coves an opening of the housing main body 14A.

A pump chamber 16 is formed in the interior of the pump housing 14, and an impeller 18 of a centrifugal type is rotatably received in the pump chamber 16. The impeller 18 is fixed to an end of a shaft 64 of an armature 62 of the motor 60. The impeller 18 is rotated upon rotation of the armature 62 through the shaft 64, so that washer fluid (liquid) is drawn from an inlet 20 into the pump chamber 16 and is then discharged through an outlet 22.

A generally rectangular parallelepiped circuit boxy 24 is formed integrally with the motor housing 12 on a radially outer side of the motor 60. The circuit box 24 receives a control circuit 90 and has an opening 24A on one axial side (Z1 side) thereof in the axial direction of the motor 60 like in the motor housing 12. The opening 24A is formed continuously from the opening 12A of the motor housing 12. Each opening 12A, 24A is closed by a platy closing portion 36A, which is provided in a closure member 36.

Figure 3:
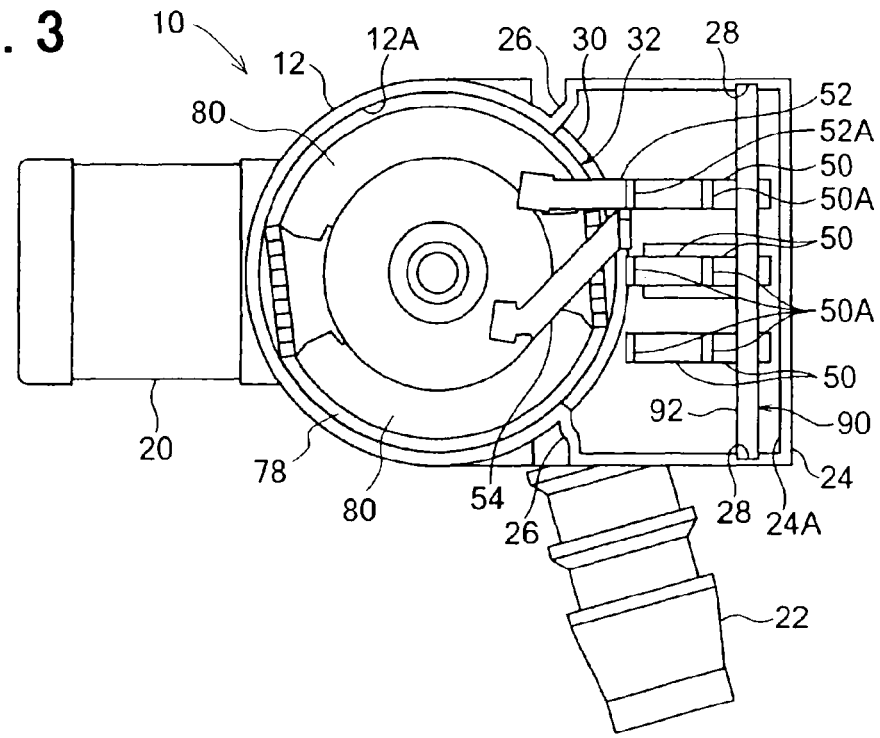
FIG. 3 is a top view of the pump apparatus without a closure member.

As shown in FIG. 3, two fixing portions 26 are provided between the motor housing 12 and the circuit box 24 such that each fixing portion 26 is recessed at a corresponding boundary area between an outer peripheral part of the motor housing 12 and a lateral side of the circuit box 24. The fixing portions 26 are used to fix the pump apparatus 10 to a washer tank 102 described latter.

As shown in FIGS. 2 and 3, two guide grooves 28 are formed in an inner peripheral surface of the circuit box 24 to extend in a direction generally parallel to the axial direction of the motor 60. One axial end (i.e., an axial end on the Z1 side of the motor 60) of each guide groove 28 is opened in an end surface of the circuit box 24 at the opening 24A. Two lateral edges of a circuit board 92 of the control circuit 90 are guided and held in the guide grooves 28, respectively. As shown in FIG. 1, a control relay 94 and other electrical elements (electrical components) 96 for controlling the motor 60 are installed on the circuit board 92.

Furthermore, as shown in FIGS. 1 and 2, a partition wall 30 is provided between the motor housing 12 and the circuit box 24 to extend in a direction generally parallel to the axial direction of the motor 60. An opening 12A, 24A side of the partition wall 30 is notched (recessed) from the opening 12A, 24A side to form a communicating portion (communicating space) 32, which communicates between the interior of the motor housing 12 and the interior of the circuit box 24. Here, the interior of the motor housing 12 and the interior of the circuit box 24 form an interior part of the pump apparatus 10.

Furthermore, an opening 12A side part of the motor housing 12 and an opening 24A side part of the circuit box 24 form an outer side peripheral wall portion 34 (corresponding to a peripheral wall portion of the present invention), which are placed outward of an inner side peripheral wall portion 38 of the closure member 36 described below. A fitting recess 34A is formed in an inner peripheral surface of the outer side peripheral wall portion 34 to extend all around the outer side peripheral wall portion 34.

The inner side peripheral wall portion 38 (serving as a fitting wall portion of the present invention) protrudes from the closing portion 36A of the closure member 36 along an outer peripheral edge portion of the closing portion 36A. A fitting protrusion 38A is formed in an outer peripheral surface of the inner side peripheral wall portion 38 to extend all around the inner side peripheral wall portion 38. The inner side peripheral wall portion 38 is placed inward of the outer side peripheral wall portion 34 of the motor housing 12 and of the circuit box 24, and the fitting protrusion 38A of the inner side peripheral wall portion 38 is snap fitted into the fitting recess 34A of the outer side peripheral wall portion 34. In this way, the closure member 36 is integrally installed to the motor housing 12 and the circuit box 24.

As shown in FIG. 2, a bearing support 40 is formed in a motor housing 12 side part (a part located on the left side of the partition wall 30 in FIG. 2) of the closing portion 36A of the closure member 36, and a bearing 42 is installed and is supported in the bearing support 40. Two brush holders (anode side and cathode side brush holders) 68, which are provided to the motor 60, are installed in the motor housing 12 side part of the closing portion 36A. In FIG. 2, only the anode side brush holder 68 is depicted while the cathode side brush holder is not depicted. The anode side brush holder 68 and the cathode side brush holder are diametrically opposed to each other about the armature 62 of the motor 60 and have generally the same structure.

A brush box 70 is provided in the brush holder 68, and a brush 72 is received in the brush box 70. Furthermore, a stub 44 protrudes from the motor housing 12 side part of the closing portion 36A, and a spring 74 is installed to the stub 44. The spring 74 inwardly urges the brush 72 against a commutator 66 of the armature 62 in a radial direction of the motor 60.

Figure 4:
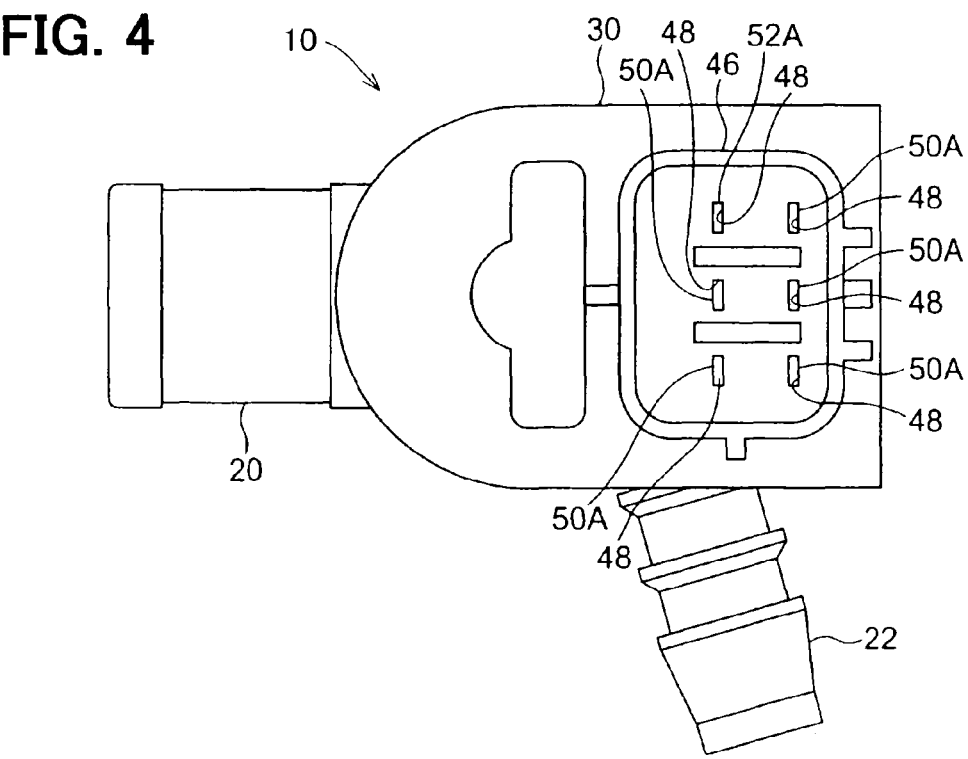
FIG. 4 is a top view of the pump apparatus with the closure member.

As shown in FIGS. 2 and 4, a connector 46 is formed in a circuit box 24 side part (a part located on the right side of the partition wall 30 in FIG. 2) of the closing portion 36A to project on the one axial side (Z1 side) in the axial direction of the motor 60. The connector 46 is connected to an external connector 220 (see FIG. 7) of an external power supply device. Furthermore, a plurality (six in this embodiment) of terminal receiving holes 48 penetrates through an inner part of the connector 46 at the closing portion 36A in a plate thickness direction of the closing portion 36A. Terminals 50, 52 are received through the terminal receiving holes 48, respectively.

One end of each terminal 50 (hereinafter, referred to as a circuit terminal 50) is electrically connected to the circuit board 92 by, for example, soldering in the interior of the circuit box 24, and the other end of the terminal 50 forms a connection contact 50A, which is placed in the connector 46 at the outside of the circuit box 24 (an exterior part of the pump apparatus 10) and is electrically connectable with a corresponding connection contact of the external connector 220.

Furthermore, the terminal 52 (hereinafter, referred to as a motor terminal 52) extends in the interior of the circuit box 24 and the interior of the motor housing 12 such that one end of the terminal 52 is electrically connected to the cathode side brush of the motor 60 through an electrical connection element, i.e., an electrical connector (not shown), and the other end of the terminal 52 forms a connection contact 52A, which is placed outside of the pump apparatus 10 and is connectable with a corresponding connection contact of the external connector 220.

Furthermore, a terminal 54 (hereinafter, referred to as a connection terminal 54) is provided in the interior of the motor housing 12 and the interior of the circuit box 24. One end of the connection terminal 54 is placed in the interior of the motor housing 12 and is electrically connected to the anode brush 72 through an electrical connection element 76, and the other end of the connection terminal 54 is placed in the interior of the circuit box 24 and is electrically connected to the circuit board 92 by, for example, soldering. The one end of the connection terminal 54 and the one end of each motor terminal 52 are guided from the circuit box 24 side into the motor housing 12 side through the communicating portion 32.

Furthermore, the pump apparatus 10 having the above structure is assembled through, for example, the following assembling method.

FIGS. 5A to 5C are diagrams for describing the assembling method of the pump apparatus 10. With reference to FIGS. 5A to 5C, first, the one end of each circuit terminal 50 and the other end of the connection terminal 54 are electrically connected to the circuit board 92, to which the control relay 94 and the other electrical elements 96 are installed. Furthermore, the other end of each circuit terminal 50 and the other end of the motor terminal 52 are received through the corresponding terminal receiving holes 48, respectively.

Then, the bearing 42 is inserted in the bearing support 40 of the closure member 36, and the brush holders 68 are installed integrally to the closing portion 36A of the closure member 36. At this time, the one end of the motor terminal 52 is electrically connected to the cathode brush (not shown) of the motor 60 through the connection element (not shown), and the one end of the connection terminal 54 is electrically connected to the anode brush 72 through the connection element 76. Furthermore, the brush 72 is received in the brush box 70 of the brush holder 68, and the spring 74 is installed to the stub 44 of the closing portion 36A such that the spring 74 inwardly urges the brush 72 in the radial direction (the process up to here will be referred to as a first step).

Then, the one axial end of the shaft 64 provided to the armature 62 of the motor 60 is inserted through the bearing 42, and the entire armature 62 is supported by the closure member 36 (the process up to here will be referred to as a second step). At the time of supporting the armature 62 by the closure member 36, the brush 72, which is urged radially inward, is held in a retracted position (a radially outer position) in the brush box 70 against the urging force of the spring 74. The brush 72 is released from the retracted position and is then engaged with the commutator 66 of the armature 62 after the assembling of the armature 62 to the closure member 36.

Next, the motor housing 12 and the circuit box 24 are installed integrally to the closure member 36 while a yoke 78 and magnets 80 (see FIG. 3) of the motor 60 are placed in the interior of the motor housing 12.

At this time, the inner side peripheral wall portion 38 is placed inward of the outer side peripheral wall portion 34 of the motor housing 12 and of the circuit box 24, and the fitting protrusion 38A of the inner side peripheral wall portion 38 is fitted into the fitting recess 34A of the outer side peripheral wall portion 34. Furthermore, the entire control circuit 90, which includes the circuit board 92 and the control relay 94 as well as the other electrical elements 96, is received in the circuit box 24 while the lateral edges of the circuit board 92 are guided along the guide grooves 28. Also, at this time, a seal material is applied to the boundary part between the closing portion 36A of the closure member 36 and the outer peripheral part of the motor housing 12 to implement a required sealing of the interior of the pump apparatus 10 (the process up to here will be referred to as a third step).

Thereafter, the impeller 18 (FIG. 2) is received in the pump chamber 16, and the cover 14B (FIG. 2) is installed to the housing main body 14A (the process up to here will be referred to as a fourth step). The pump apparatus 10 is assembled through the above assembling method.

As described above, according to the present embodiment, before the assembling of the closure member 36 to the motor housing 12 and the circuit box 24, the one end of each circuit terminal 50 and the other end of the connection terminal 54 are electrically connected to the circuit board 92, while the one end of the motor terminal 52 is electrically connected to the cathode brush (not shown) of the motor 60 through the connection element (not shown), and the one end of the connection terminal 54 is electrically connected to the anode brush 72 of the motor 60 through the connection element 76. Thereby, it is possible to avoid the blind connection at the connection between the one end of each circuit terminal 50 and the circuit board 92, the connection between the other end of the connection terminal 54 and the circuit board 92, the connection between the one end of the motor terminal 52 and the connection element (not shown) and the connection between the one end of the connection terminal 54 and the connection element 76. The above assembling process should be only considered as the example and may be modified in any appropriate manner by, for example, changing the steps of the assembling process.

The pump apparatus 10, which is assembled in the above described manner, and the washer tank 102 form a washer system 100 of the vehicle.

Figure 6:
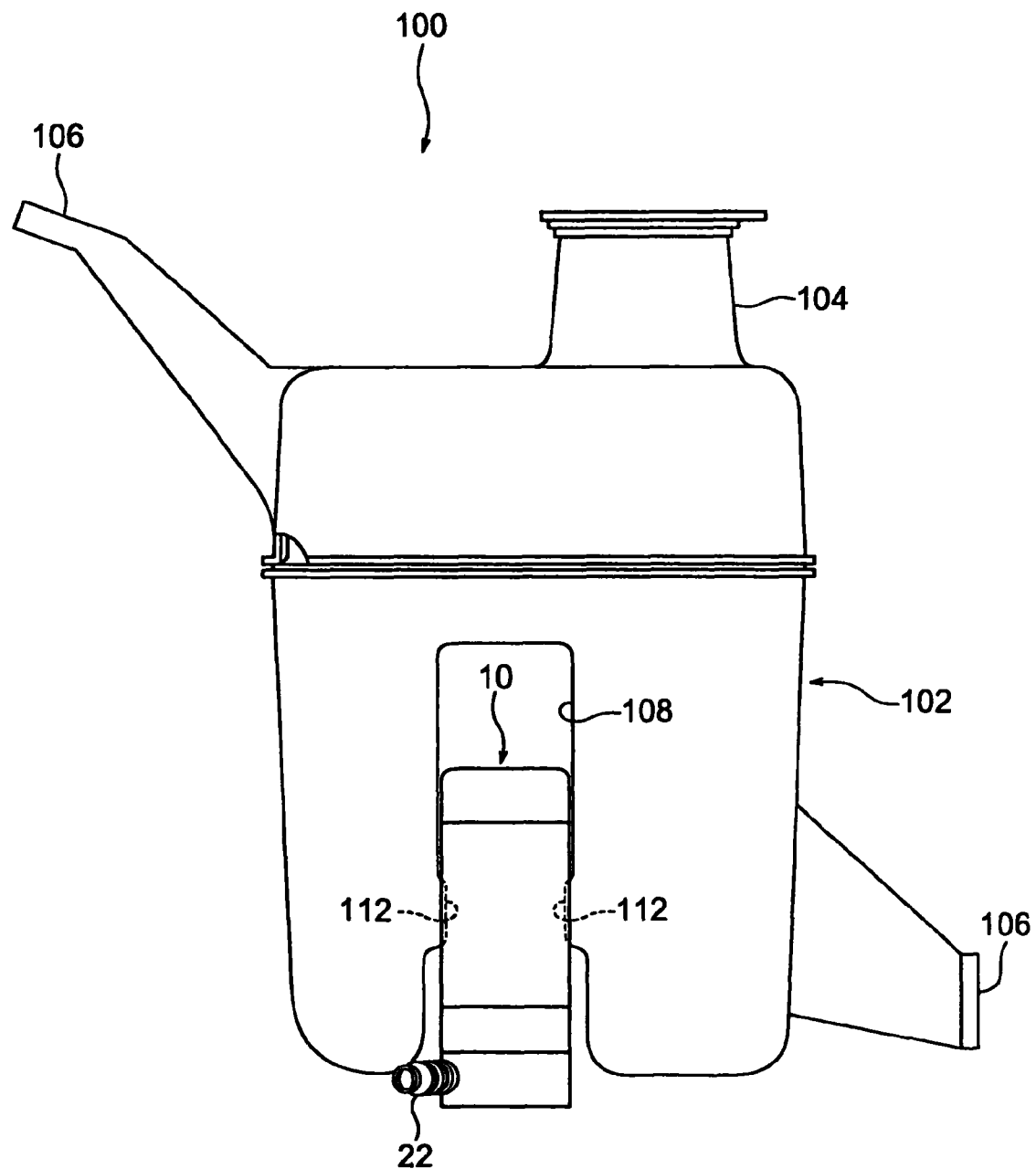
FIG. 6 is a front view showing the pump apparatus assembled to a washer tank of a washer system of a vehicle according to the embodiment.
Figure 7:
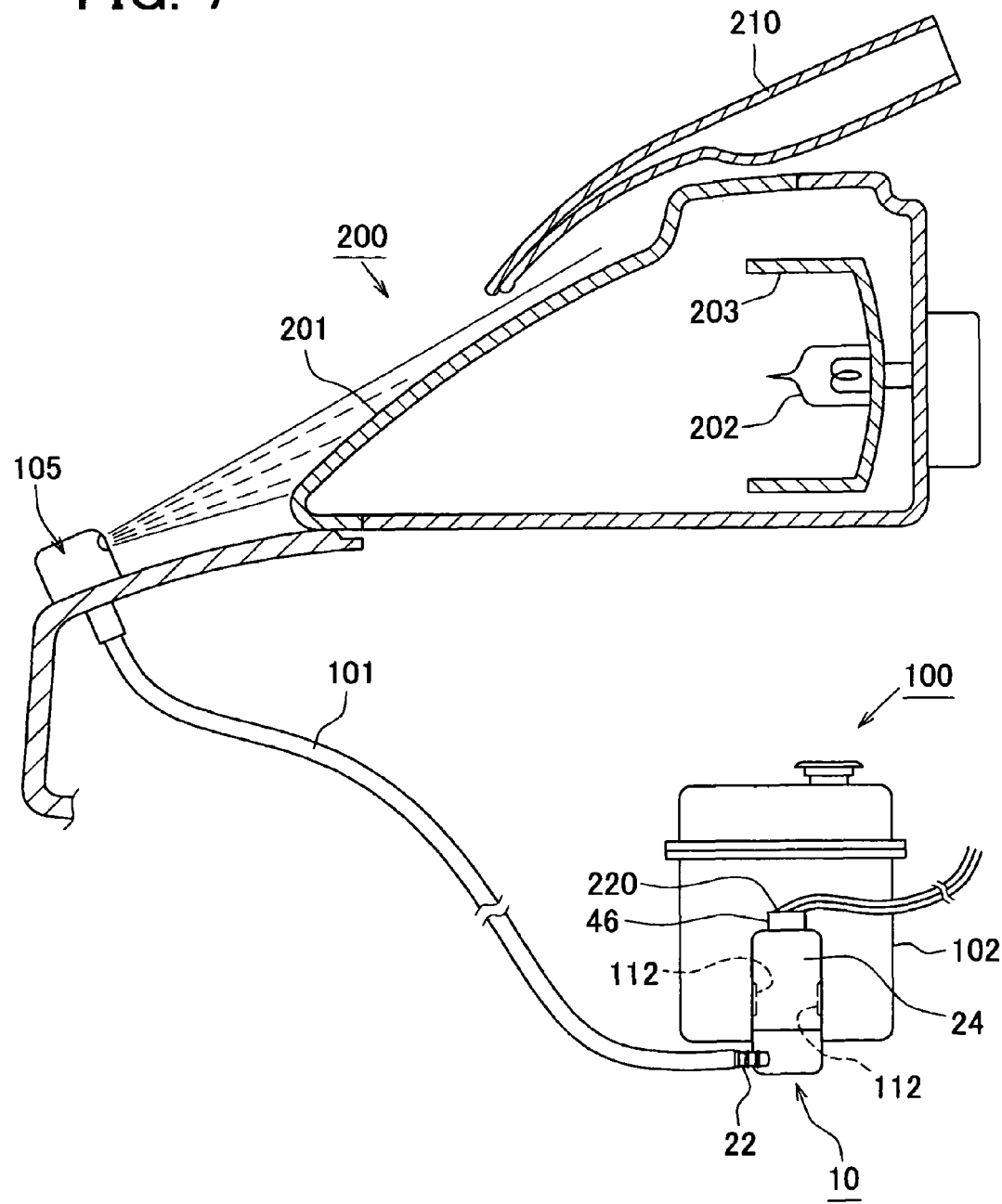
FIG. 7 is a schematic view showing arrangement of the washer system relative to a headlamp of the vehicle.

FIGS. 6 to 9 show the washer system 100 having the pump apparatus 10. The washer system 100 can be appropriately used to spray washer fluid over the headlamps 200 (or the window glass) of the vehicle. FIG. 7 illustrates the case where the washer system 100 is used to spray the washer fluid over a lens 201 of the head lamp 200, which is installed to a vehicle body 210 and includes a light bulb 202 for emitting light and a reflector 203 for reflecting the emitted light toward the front side of the vehicle through the lens 201.

With reference to FIG. 6, the washer system 100 includes the washer tank 102. The washer tank 102 has a fill port 104 at a top side thereof, and the washer fluid is poured into the interior of the washer tank 102 through the fill port 104. The washer tank 102 has a fixture 106 at an appropriate location to fix the washer tank 102 to the vehicle body through the fixture 106.

Figure 8:
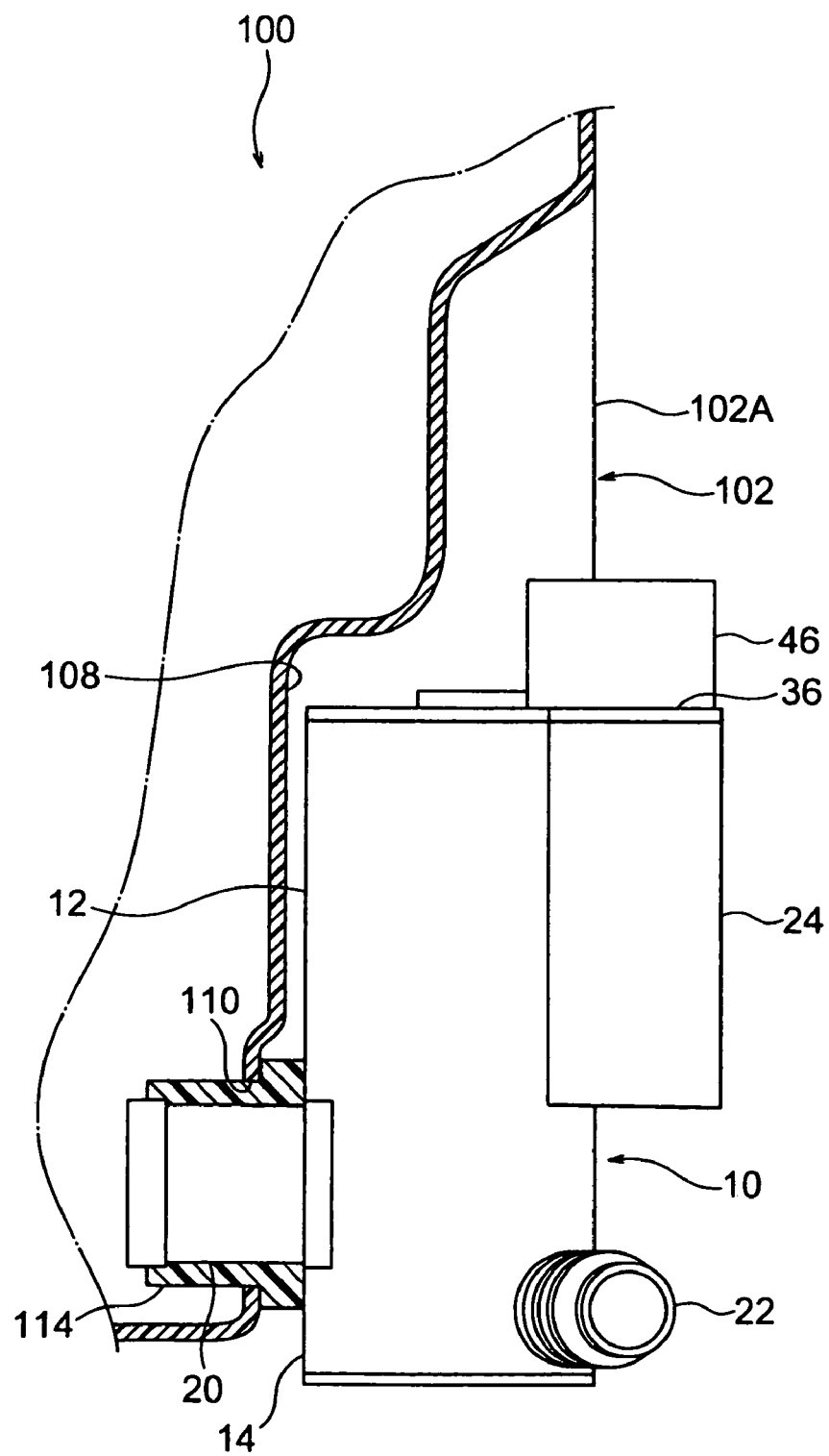
FIG. 8 is a partially fractured schematic lateral view showing the pump apparatus and the washer tank of the washer system.
Figure 9:
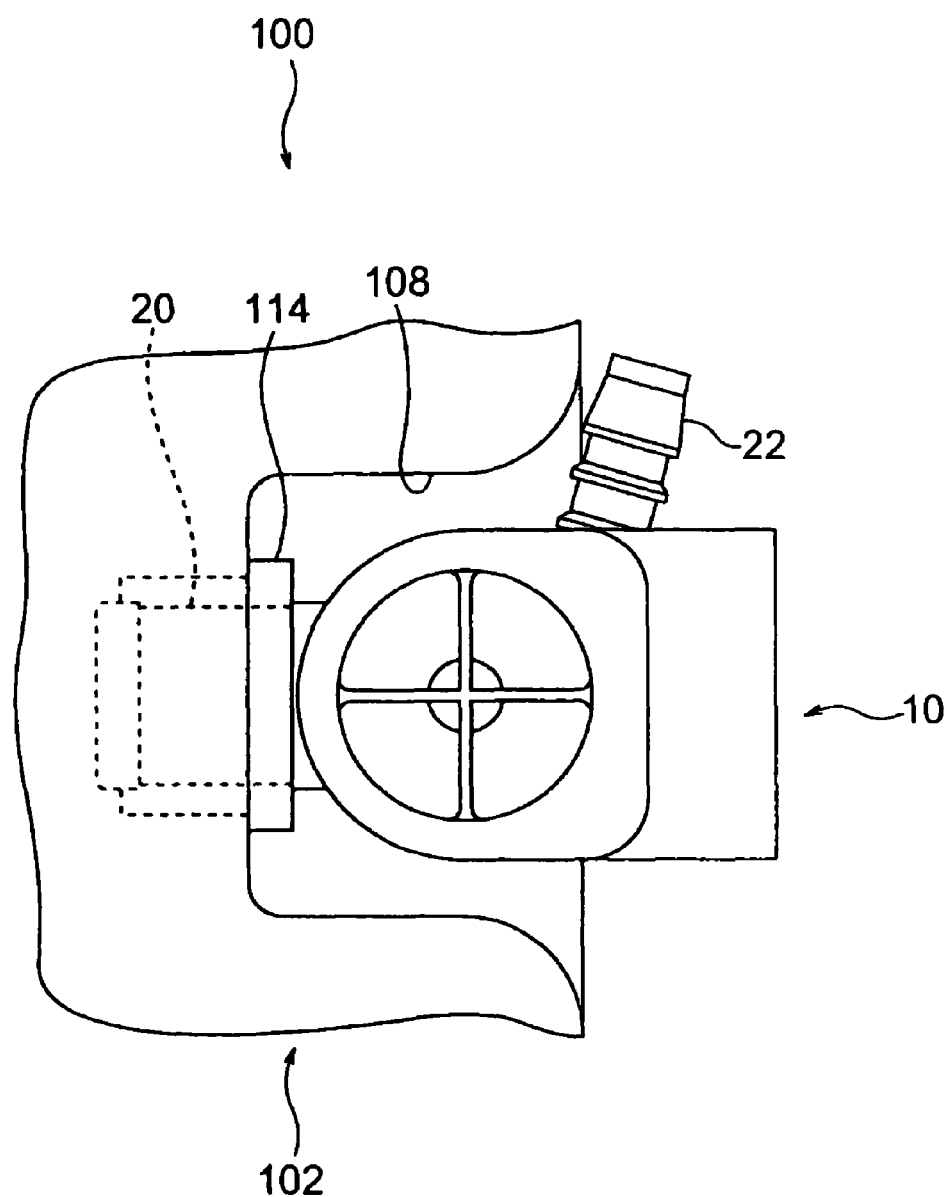
FIG. 9 is a schematic bottom view showing the pump apparatus and the washer tank of the washer system.

Furthermore, a pump receiving portion 108 is recessed at a front side of the washer tank 102. Two fixing portions 112 protrude from lateral sides of the pump receiving portion 108. A hole 110 is formed at a lower part of the pump receiving portion 108, as shown in FIG. 8.

The pump apparatus 10 is received in the pump receiving portion 108, and the inlet 20 is inserted and is fixed to the hole 110 through a grommet 114. Furthermore, the fixing portions 26 of the pump apparatus 10 shown in FIG. 3 are engaged with the fixing portions 112 of the washer tank 102 shown in FIG. 6, so that the pump apparatus 10 is installed integrally to the washer tank 102. With reference to FIG. 8, in the installed state where the pump apparatus 10 is installed to the washer tank 102, the connector 46 of the pump apparatus 10 is placed outside of the wall surface of the washer tank 102 to permit connection of the connector 46 to the external connector 220.

In the washer system 100, when the motor 60 of the pump apparatus 10 is operated, the impeller 18 is rotated through the rotation of the motor 60. Thereby, as shown in FIG. 7, the washer fluid in the washer tank 102 is pumped by the pump apparatus 10 to spray nozzles 105 (only one is shown in FIG. 7) through a hose (a fluid passage) 101 and is thereafter sprayed from the spray nozzles 105 over the respective lenses 201 of the headlamps 200 (only one is shown in FIG. 7).

Next, advantages of the present embodiment will be described.

That is, in the pump apparatus 10 of the present embodiment, the circuit box 24, which receives the control circuit 90, is provided integrally with the motor housing 12, which receives the motor 60. Therefore, even in the case where the pump apparatus 10 is integrally installed to the washer tank 102, it is only required to provide the common installation structure (the fixing portions 26 serving as the common installation structure in the present embodiment), which is common to both of the motor housing 12 and the circuit box 24, to the pump apparatus 10, and it is no longer required to provide the dedicated installation structure for installing the circuit box 24 to the washer tank 102.

Furthermore, the motor housing 12 and the circuit box 24 are integrated together, and the opening 12A of the motor housing 12 and the opening 24A of the circuit box 24 are closed with the common closure member 36. The waterproof structure is common to both of the motor housing 12 and the circuit box 24, and thereby it is not required to provide the dedicated waterproof structure for protecting the circuit box 24 from the water.

Furthermore, the connection between the motor 60 and the control circuit 90 is implemented in the interior part of the pump apparatus 10 by the connection terminal 54 arranged in the interior of the motor housing 12 and the interior of the circuit box 24. Thus, it is not required to provide the external wire harness for connecting between the motor 60 and the control circuit 90. Furthermore, since the connection between the motor 60 and the control circuit 90 is implemented in the interior of the pump apparatus 10, the required water tightness can be achieved. Thus, it is not required to use the waterproof connector for connecting between the motor 60 and the control circuit 90.

When the pump apparatus 10 of the present embodiment is used, it is not required to provide the dedicated installation structure for installing the circuit box 24 to the washer tank 102, the dedicated waterproof structure for protecting the circuit box 24 from the water, the external wire harness for connecting between the motor 60 and the control circuit 90 and the waterproof connector. Thus, it is possible to reduce the costs of the pump apparatus 10.

When the washer system 100 having the pump apparatus 10 is used, in addition to the reduction of the costs of the pump apparatus 10, it is possible to reduce the costs of the washer tank 102 due to the fact that the dedicated installation structure for installing the circuit box 24 to the washer tank 102 is not required. In this way, it is possible to reduce the costs of the entire washer system 100.

Furthermore, according to the assembling method of the present embodiment, before the assembling of the closure member 36 to the motor housing 12 and the circuit box 24, the one end of each circuit terminal 50 and the other end of the connection terminal 54 are electrically connected to the circuit board 92, while the one end of the motor terminal 52 is electrically connected to the cathode brush (not shown) of the motor 60 through the connection element (not shown), and the one end of the connection terminal 54 is electrically connected to the anode brush 72 of the motor 60 through the connection element 76. Thereby, it is possible to avoid the blind connection at the connection between the one end of each circuit terminal 50 and the circuit board 92, the connection between the other end of the connection terminal 54 and the circuit board 92, the connection between the one end of the motor terminal 52 and the connection element (not shown) and the connection between the one end of the connection terminal 54 and the connection element 76. In this way, the work efficiency at the time of assembling the pump apparatus 10 can be improved, and thereby the costs can be reduced.

Furthermore, in the pump apparatus 10 of the present embodiment, the opening 12A of the motor housing 12 and the opening 24A of the circuit box 24 are opened on the one axial side (Z1 side in FIG. 1) in the axial direction of the motor 60. Thus, the motor housing 12 and the circuit box 24 are assembled to the closure member 36 in the same direction as the assembling direction of the respective corresponding components of the motor 60 (i.e., the assembling direction of the armature 62 to the brush holders 68, and the assembling direction of the yoke 78 and the magnets 80 to the armature 62). Thereby, automation of the assembling of the pump apparatus 10 using the assembling apparatus can be made easily.

Also, in the case of the pump apparatus 10 of the present embodiment, at the time of assembling the circuit board 92 of the control circuit 90 into the circuit box 24, the lateral edges of the circuit board 92 are axially guided along the guide grooves 28. In this way, the circuit board 92 can be stably installed into the circuit box 24 without twisting the circuit board 92. Furthermore, after the assembling of the circuit board 92 into the circuit box 24, the circuit board 92 is supported by the guide grooves 28 such that the circuit board 92 is held in the stable position. In this way, for example, it is possible to reduce the stress applied to the electrical connection between the other end of the connection terminal 54 and the circuit board 92.

Furthermore, in the pump apparatus 10 of the present embodiment, the connection terminal 54 can be connected to the connection element 76 and the circuit board 92 through the communicating portion 32, which communicates between the motor housing 12 and the circuit box 24. Thereby, even in the case where the partition wall 30 is provided between the motor housing 12 and the circuit box 24, the placement of the connection terminal 54 is eased. As a result, the connection between the motor 60 and the control circuit 90 can be easily implemented in the interior of the motor housing 12 and the interior of the circuit box 24.

In addition, in the pump apparatus 10 of the present embodiment, the inner side peripheral wall portion 38, which is provided to the closure member 36, is snap fitted to the outer side peripheral wall portion 34, which is provided to the openings 12A, 24A of the motor housing 12 and of the circuit box 24. Therefore, the motor housing 12 and the circuit box 24 can be securely and easily assembled with the closure member 36.

Although the present invention is described with reference to the above embodiment, the present invention is not limited to the above embodiment. Specifically, the above embodiment may be modified in various ways without departing from the spirit and scope of the present invention.

For example, in the above embodiment, the circuit box 24 is formed integrally with the motor housing 12. Alternatively, the circuit box 24 may be formed separately from the motor housing 12 and may be assembled to the motor housing 12.

Furthermore, in such a case, rails may be provided to one of the circuit box 24 and the motor housing 12, and corresponding grooves may be provided to the other one of the circuit box 24 and the motor housing 12. When the rails are engaged with the grooves, the circuit box 24 is assembled integrally to the motor housing 12.

Furthermore, in the above embodiment, the opening 12A of the motor housing 12 and the opening 24A of the circuit box 24 are opened on the one axial side (Z1 side in FIG. 1) in the axial direction of the motor 60. Alternatively, the opening 12A of the motor housing 12 and the opening 24A of the circuit box 24 may be opened in different directions, respectively.

Also, in the above embodiment, the inner side peripheral wall portion 38 is provided to the closure member 36, and the outer side peripheral wall portion 34 is provided to the motor housing 12 and the circuit box 24. Alternatively, the outer side peripheral wall portion may be provided to the closure member 36, and the inner side peripheral wall portion may be provided to the motor housing 12 and the circuit box 24. Then, the outer side peripheral wall portion of the closure member 36 may be snap fitted to the inner side peripheral wall portion of the motor housing 12 and the circuit box 24 through use of a protrusion and a recess similar to the protrusion 38A and the recess 34A of the above embodiment.

Furthermore, in the above embodiment, the fitting protrusion 38A is provided to the inner side peripheral wall portion 38 of the closure member 36, and the fitting recess 34A is provided to the outer side peripheral wall portion 34 of the motor housing 12 and of the circuit box 24. Alternatively, the fitting recess may be provided to the inner side peripheral wall portion 38 of the closure member 36, and the fitting protrusion may be provided to the outer side peripheral wall portion 34 of the motor housing 12 and of the circuit box 24. Then, the fitting recess, which is provided in the inner side peripheral wall portion 38 of the closure member 36, may be fitted to the fitting protrusion, which is provided to the outer side peripheral wall portion of the motor housing 12 and of the circuit box 24.

Furthermore, in the above embodiment, the cathode brush is powered (directly powered) from the external power supply device through the motor terminal 52. Alternatively, the cathode brush may be indirectly powered from the external power supply device through a motor terminal, which electrically connects between the cathode brush and the circuit board 92, and also through a circuit terminal, which electrically connects between the circuit board 92 and the external connector (i.e., indirectly powered through the circuit board 92).

Furthermore, in the above embodiment, at the time of assembling the closure member 36 and the circuit board 92 together, the other ends of the circuit terminals 50 are inserted through the terminal receiving holes 48 while the one ends of the circuit terminals 50 being connected to the circuit board 92, so that the circuit board 92 is supported on the closure member 36. This may be modified as follows.

That is, as shown in FIGS. 10A to 10C, a support portion 56 may be provided in the closure member 36 at a location, which corresponds to the circuit board 92. Then, at the time of assembling the closure member 36 and the circuit board 92 together, the other ends of the circuit terminals 50 having the one ends connected to the circuit board 92 may be inserted through the terminal receiving holes 48, and an end portion (a lower end portion in FIG. 10A) of the circuit board 92 may be inserted into the support portion 56 to support the circuit board 92 on the closure member 36.

In this way, it is possible to limit wobbling of the circuit board 92 relative to the closure member 36 at the time of assembling the closure member 36 and the circuit board 92 together to reduce the stress applied to the electrical connections between the circuit terminals 50 and the circuit board 92.

Additional advantages and modifications will readily occur to those skilled in the art. The invention in its broader terms is therefore not limited to the specific details, representative apparatus, and illustrative examples shown and described.

What is claimed is:

1. A pump apparatus comprising:
   a pump housing that has a pump chamber, which receives an impeller, wherein the impeller is rotated by an electric motor to pump liquid out of an external tank;
   a motor housing that is formed integrally with the pump housing and receives the motor through a motor housing opening;
   a circuit box that is formed integrally with the motor housing and receives a control circuit, which is electrically connected to the motor through at least one connection terminal and controls rotation of the motor, wherein an interior of the circuit box and an interior of the motor housing form an interior part of the pump apparatus, and the circuit box is placed on one side of the motor housing in a direction generally perpendicular to an axial direction of the motor;
   a closure member that includes a closing portion, which is formed continuously and integrally to close both the motor housing opening and a circuit box opening, wherein the closing portion includes a plurality of terminal receiving holes that communicate between the interior part and an exterior part of the pump apparatus; and
   a plurality of terminals, each of which is inserted through a corresponding one of the plurality of terminal receiving holes, wherein one end of each terminal is placed at the interior part of the pump apparatus and is electrically connected to a corresponding one of the motor and the control circuit while the other end of each terminal is placed at the exterior part of the pump apparatus and forms a connection contact that is electrically connectable with a corresponding connection contact of an external connector, wherein:
   a partition wall is formed between the motor housing and the circuit box and defines a communicating space, which extends from the partition wall to the closing portion of the closure member in the axial direction of the motor and communicates between the interior of the motor housing and the interior of the circuit box;
   the communicating space is opened to both the motor housing opening and the circuit box opening;
   the at least one connection terminal is provided in the interior part of the pump apparatus to connect between the motor and the control circuit through the communicating space;
   the pump chamber of the pump housing is located on a side of the motor housing, which is opposite from the motor housing opening and the circuit box opening in the axial direction of the motor; and
   the closing portion of the closure member holds the at least one connection terminal and is adapted to place a portion of each of the at least one connection terminal in the communication space when the closing portion of the closure member is installed to and closes the motor housing opening and the circuit box opening.

2. The pump apparatus according to claim 1, wherein: the control circuit includes a circuit board; and at least one guide groove is formed in an inner peripheral surface of the circuit box to guide at least one edge of the circuit board in a direction generally parallel to the axial direction of the motor.

3. The pump apparatus according to claim 1, wherein:
a peripheral wall portion is formed at the opening of the motor housing and the opening of the circuit box; and
a fitting wall portion is formed in the closure member and is snap fitted to the peripheral wall portion at one of an inner side and an outer side of the peripheral wall portion through mating of a fitting protrusion, which is provided in one of the fitting wall portion and the peripheral wall portion, to a fitting recess, which is provided in the other one of the fitting wall portion and the peripheral wall portion.

4. The pump apparatus according to claim 1, wherein the closure member has a support portion, which supports an end of the circuit board in a state where each of the plurality of terminals is inserted through the corresponding one of the plurality of receiving holes.

5. A washer system for a vehicle, comprising:
the pump apparatus of claim 1; and
a washer tank, which serves as the external tank and receives washer fluid as the liquid, wherein the pump apparatus is assembled to the washer tank.

6. The washer system according to claim 5, further comprising:
a spray nozzle that sprays the washer fluid, which is supplied from the washer tank through the pump apparatus, over a headlamp of the vehicle; and
a fluid passage that conducts the washer fluid from the pump apparatus to the spray nozzle.

7. The pump apparatus according to claim 1, wherein:
one end of each connection terminal is placed in the interior of the motor housing, and the other end of the connection terminal is placed in the interior of the circuit box;
a connection between the one end and the other end of each connection terminal passes through the communicating space; and
the one end and the other end of each connection terminal are located on one axial side of the communicating space, which is opposite from the closing portion of the closure member in the axial direction of the motor.

8. The pump apparatus according to claim 1, wherein:
a bearing support is formed in the closing portion, and
the pump apparatus further comprises a bearing held in the bearing support, between the closing portion and the motor.

\* \* \* \* \*